Jan. 8, 1924.

G. W. PRISBREY

WATER POWER PLANT

Filed Aug. 7, 1922

Witness
H. Woodard

Inventor
G. W. Prisbrey
By H. B. Wilson & Co.
Attorneys

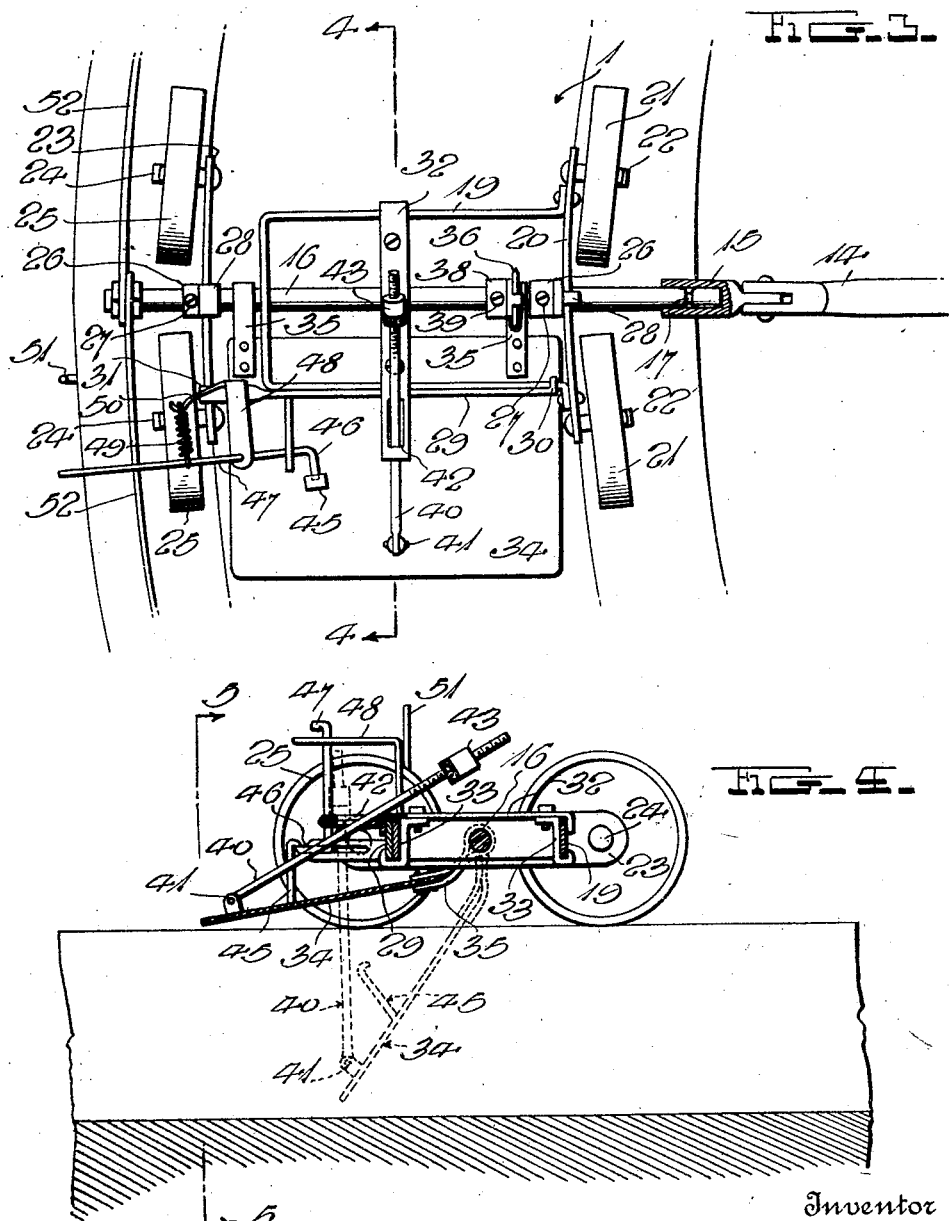

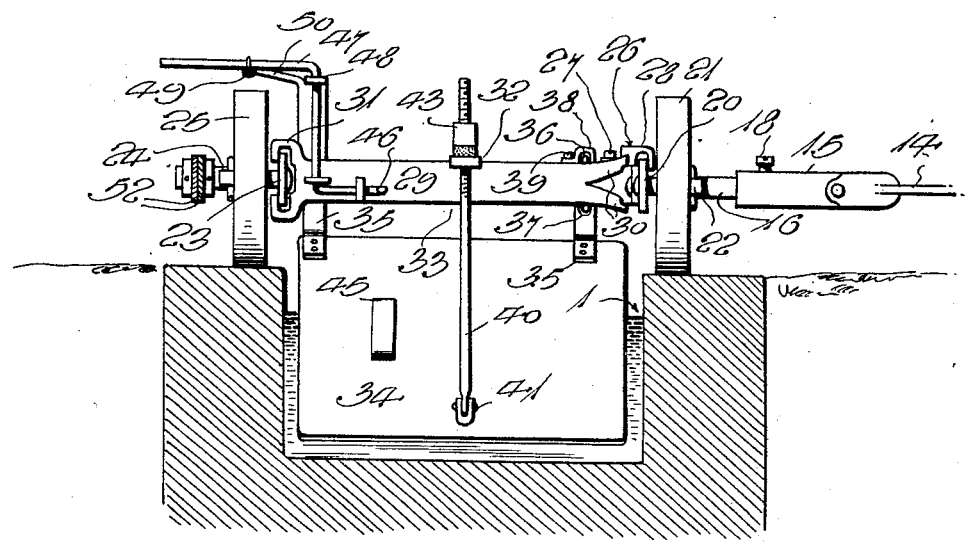
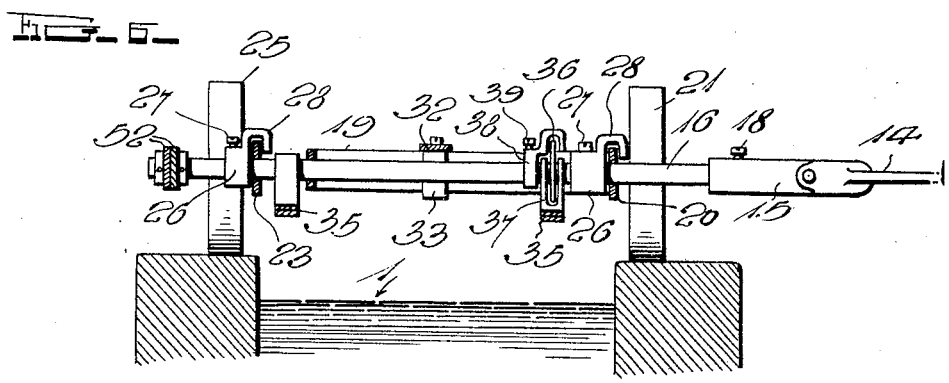
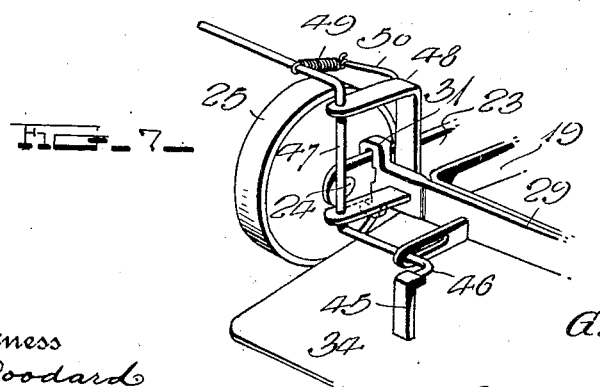

Patented Jan. 8, 1924.

1,480,299

UNITED STATES PATENT OFFICE.

GEORGE W. PRISBREY, OF ST. GEORGE, UTAH, ASSIGNOR OF THIRTY-FOUR SEVENTY-SECONDS TO WICKS LARSON & CO., OF ST. GEORGE, UTAH.

WATER-POWER PLANT.

Application filed August 7, 1922. Serial No. 580,167.

*To all whom it may concern:*

Be it known that I, GEORGE W. PRISBREY, a citizen of the United States, residing at St. George, in the county of Washington and State of Utah, have invented certain new and useful Improvements in Water-Power Plants; and I do declare the following to be a full, clear, and exact description of the invention, such as will enable others skilled in the art to which it appertains to make and use the same.

This invention relates to an improved water power plant and one object of the invention is to provide a water power plant which will be water driven and which will include an operating element which is rotatably mounted and provided with radiating arms carrying carriages which will rest upon the side portions of a substantially circular trough and carry paddle elements which will extend down into the trough so that the water which passes through the trough may act upon the paddles or blades to impart rotary movement to the operating device.

Another object of the invention is to provide a water power plant having an improved trough construction, the trough being formed substantially circular and inclined downwardly from one end to the other so that as the carriages move along the trough, they may move freely, this being due to the fact that they are moving down hill and further the water will also be flowing down hill.

Another object of the invention is to provide a water power plant in which the water may pass into a spillway at the lower end of the trough, this spillway communicating with a sump or pit so that a portion of the water may be taken up by a pump and pumped to any point where it is to be used.

Another object of the invention is to provide a water power plant in which the carriages may be returned from the lower end of the trough to the upper or inlet end thereof through the medium of a bridge structure connecting the two end portions of the trough.

Another object of the invention is to so construct this bridge structure that the paddle blades of the carriages may be moved to an inoperative position after the carriages have passed partially over the bridge. It will be noted that by having the paddle blades moved to the inoperative position after the carriages have passed partially over the bridge, the water in the trough will assist in moving the carriages over the bridge.

Another object of the invention is to provide a water power plant which will be very effective in operation and which will be comparatively simple in construction.

Another object of the invention is to provide a water power plant having an improved carriage construction, this carriage being so constructed that it may be adjusted to accommodate itself to the width of a trough and thus permit of the trough being built of a desired width without it being necessary to provide special constructed carriages according to the width of trough desired.

This invention is illustrated in the accompanying drawings, wherein:

Figure 3 is an enlarged top plan view of the carriage.

Figure 4 is a sectional view taken along the line 4—4 of Fig. 3.

Figure 5 is a view taken along the line 5—5 of Fig. 4 with the carriage shown in elevation.

Figure 6 is a sectional view through the carriage taken at right angles to the view shown in Fig. 4.

Figure 7 is a perspective view of one corner portion of the carriage.

Figure 8 is an enlarged fragmentary view of the operating device, shown partially in elevation and partially in section.

Figure 1:
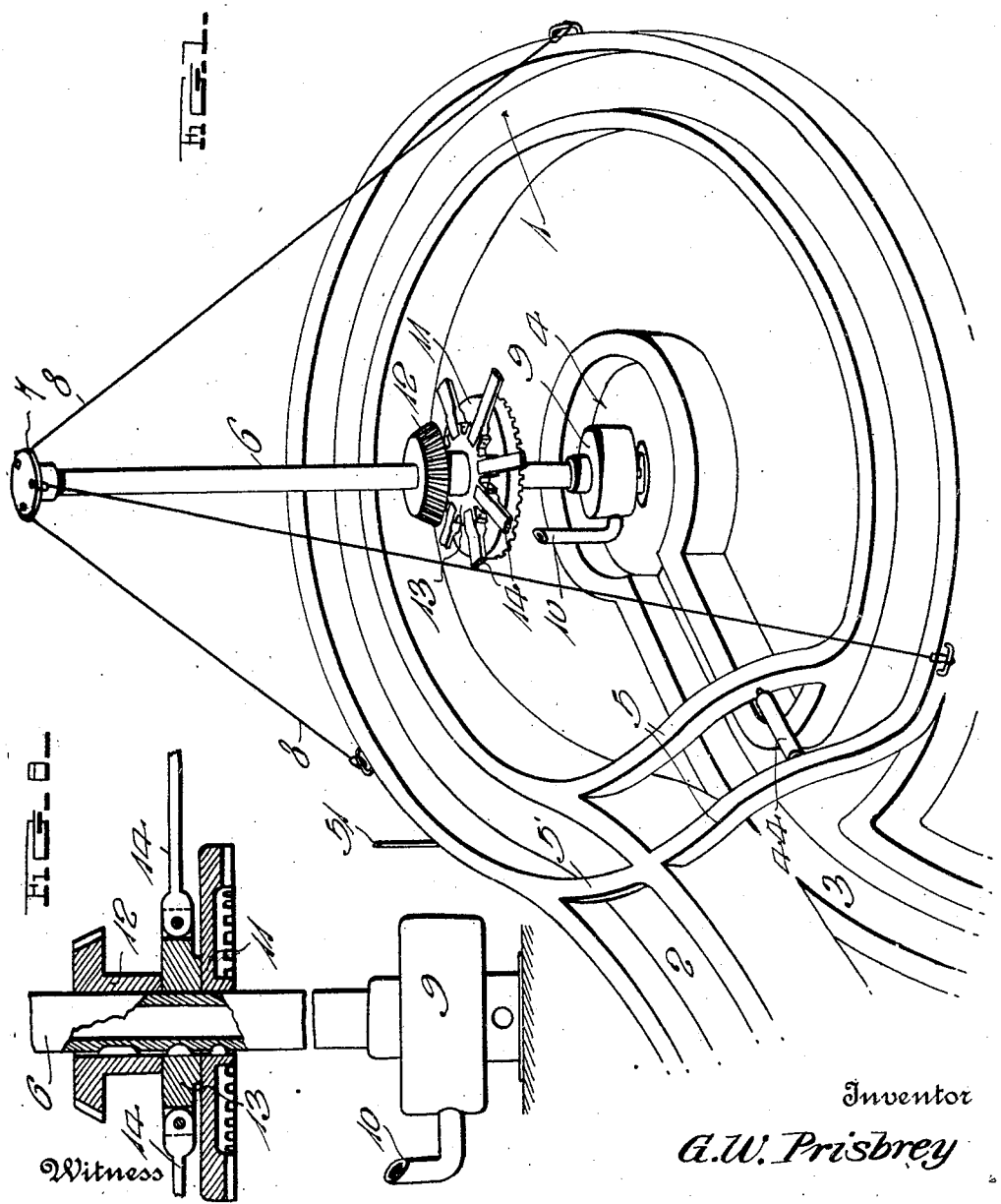
Figure 1 is a perspective view of the trough with a portion of the remaining structure shown in place.

This improved water power plant includes a trough 1 which is substantially circular in shape and so built that it extends at a downward incline from its inlet and to its outlet end, the inlet end having a continuation 2 providing a feed trough which will lead to a river or other suitable source of water supply so that the water can run downgrade from the river to the inlet end of the trough. This trough 1 will have its outlet end communicating with a spillway 3, which extends downgrade from the outlet end of the trough and communicates with the river at a point a sufficient distance down stream from the inlet of the feed trough to permit the water to be returned to the river. This spillway is extended inwardly beyond the outlet end of the trough and communicates with a well or sump 4 about which the circular trough extends. It will therefore be seen that this structure is so built that it extends at a downward incline from the point at which the water enters the feed trough to the point at which the water is returned to the river, and that therefore the water while passing through the structure will at all points be flowing down hill. It is of course necessary that the carriages to be hereinafter described must return from the lower outlet end of the trough to the upper inlet end portion thereof and therefore there has been provided a bridge consisting of bars 5 which extend upwardly from the lower outlet end portion of the trough to the upper inlet end portion. One of these bridge elements will have a continuation or extension 5' which extends across the trough as shown in Fig. 1 so that the carriage will not drop into the upper inlet end portion of the trough. It will be observed that the trough is provided with relatively thick inner and outer walls which will provide supports or tracks upon which the wheels or rollers of the carriages to be hereinafter described will rest.

Figure 2:
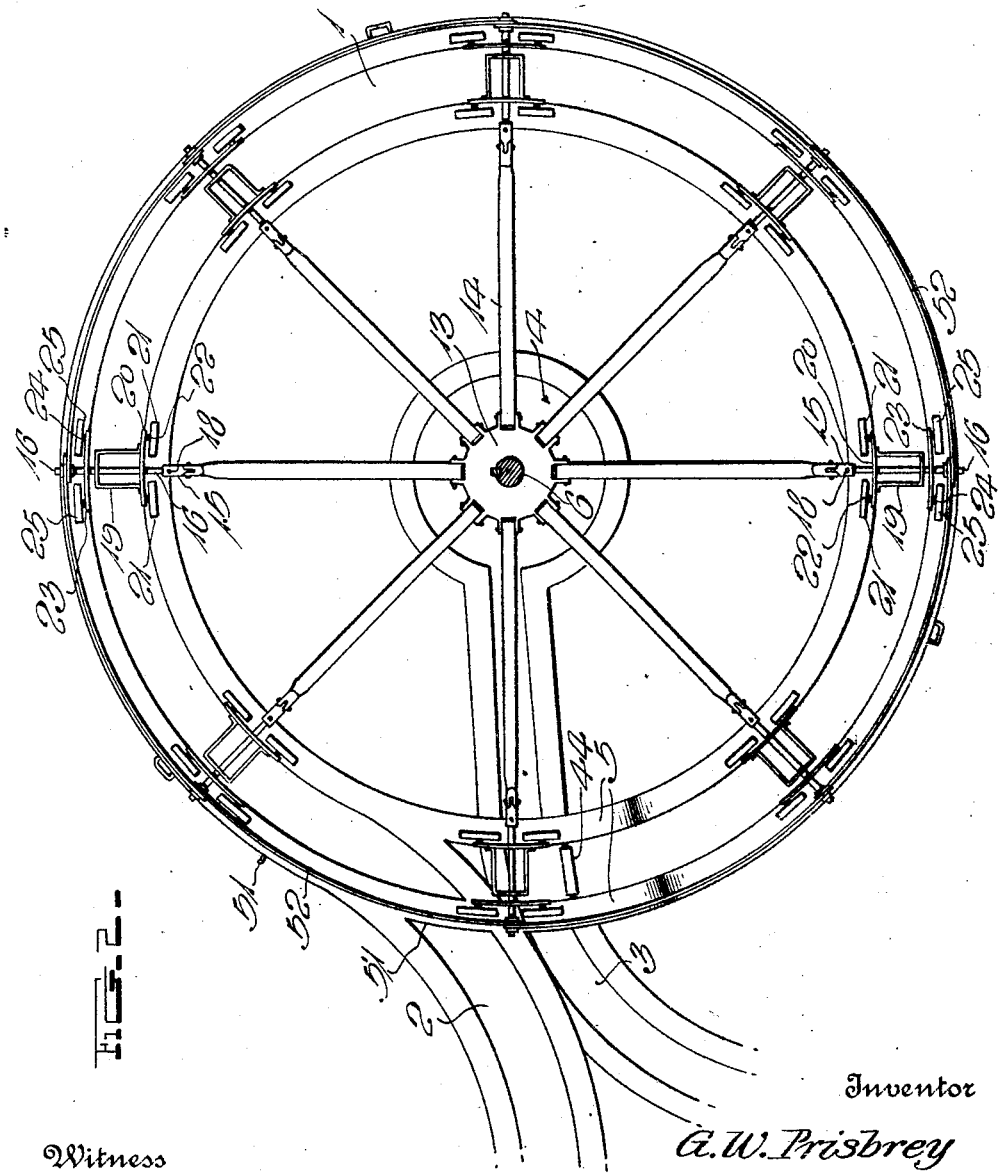
Figure 2 is a top plan view of the water power plant with the mast or vertical shaft shown in section.

The operating element is provided with a vertically disposed mast or standard 6 which has its upper end portion fitting into a thrust bearing 7 from which extends cables 8 so that the mast may be supported and braced in the vertical position. The lower end of this mast or standard 6 extends into and will be suitably journaled in a pump housing 9 which is positioned within the wall 4 and will have a conventional rotary pump construction so that when the mast or shaft 6 is rotating, water may be drawn from the well 4 and forced through the outlet pipe 10 of the pump to a point where the water is to be stored or used for irrigating purposes. This mast carries a large gear disk 11 and a smaller bevel gear 12 and between these gears 11 and 12, there is mounted a bearing disk 13. From an inspection of Fig. 8, it will be readily seen that these gears and the bearing disk will be rigidly secured upon the shaft or mast 6 so that they will rotate with the mast. Power can thus be obtained from the mast or standard 6 through suitable shafting which will be provided with gears for meshing with the gears 11 and 12. Arms 14 are pivotally connected with the bearing disk 13 and these arms extend in radiating relation to the disk and terminate adjacent the inner wall of the trough as shown in Fig. 2. At their outer ends, these arms carry sockets 15 which are pivotally connected with the arms for vertical movement. From an inspection of Fig. 2, it will be readily seen that when the device is in use, the arms may have vertical movement and the carriages which are connected with the sockets 15 may also have vertical movement due to the fact that the sockets are mounted for vertical movement. Each of the carriages is of a duplicate construction and will be constructed as shown clearly in the figures designated 3, 4, 5, 6 and 7.

Referring to these figures, it will be seen that each carriage is provided with a shaft 16 which has its inner end portion fitting into a socket 15 and provided with an annular groove 17 into which a set screw 18 will fit to securely but releasably connect the shaft of the carriage with the arm 14. The shaft 16 extends through a frame having a U-shaped section 19, the arms of which are riveted to a cross bar 20. This cross bar 20 and the cross head of the U-shaped member 19 are provided with openings to receive the shaft. It will thus be seen that the carriage will be loosely mounted upon the shaft and may have tilting movement necessary in order to permit of its passing around the trough and over the bridge. The cross bar 20 extends beyond the arms of the U-shaped member 19 and rollers or wheels 21 are mounted upon stub axles 22 carried by the end portions of this cross bar. These wheels are to rest upon the inner wall of the trough. It should be noted that the cross bar 20 is slightly curved longitudinally so that the stub axles extend at the angle shown in Fig. 3 with the wheels mounted thereon assuming the angular relation disclosed which will permit of them following the curvature of the trough. Upon the outer end portion of the shaft, there has been provided bar 23 which is curved longitudinally a slight amount and carries stub axles 24 upon which are mounted wheels 25 intended to rest upon the outer wall of the trough. In order to hold the cross bars in the proper position upon the shaft to properly space the inner and outer wheels of the carriage, there has been provided blocks 26 which are releasably held in the desired position by means of set screws 27 and are provided with hook extensions 28 which engage the bars 20 and 23 and serve to prevent them from having sliding movement upon the shaft and at the same time serve to limit vertical tilting movement of the cross bars. A side bar 29 fits against one of the side arms of the U-shaped member 19 and is provided at one end with divergently extending fingers 30 which extend above and below the side arms of this U-shaped member and terminate in bent end portions which engage the side arms to prevent this side bar 29 from having tilting movement at this end. At the opposite or outer end of the side bar 29, there has been provided hooked arms 31 which engage the bar 23 and serve to connect this side bar 29 with the cross bar 23. A cross strip 32 extends transversely of the U-shaped member 19 and carries clamps 33 which engage the side arms of the U-shaped members and side bar 29 as shown in Fig. 4. It will thus be seen that when these clamps are tightened, the strip 32 will be securely held in the proper position upon the U-shaped frame and the side bar 29 will be prevented from having sliding movement. With the clamps 26 and 33 loosened, the carriage can be made wider or narrower as may be necessary to properly position the wheels upon the inner and outer walls of the trough and after the carriage has been properly adjusted and the cross strip 32 positioned so that it is located approximately half way between the inner and outer wheels, the clamps may be tightened and the relatively adjustable parts of the carriage will be secured in the set position.

The paddle blade 34 which is to extend down into the trough as shown in Fig. 5 is positioned beneath the carriage and is provided with hanger straps 35 which fit upon the shaft 16 and form hinges which mount the paddle blade for vertical swinging movement. It is desired to have this paddle blade held against movement longitudinally of the shaft and therefore there has been provided a disk 36 which fits upon the shaft and is positioned in a slot 37 formed in one of these hinges, a clamp 38 which is similar to the clamp 26 being mounted upon the shaft and engaging the disk so that this disk cannot have sliding movement upon the shaft when the securing screw 39 of this clamp is tightened. When the paddle blade is in the position shown in Fig. 5, it must be braced and in order to do so, there has been provided a bracing rod 40 which is hingedly connected with the blade as shown at 41 and has its free end portion extending through a slot 42 formed in the cross strip 32. An abutment 43 is threaded upon the free end portion of this bracing rod and will engage the cross strip 32 to limit downward movement of this bracing rod through the slot. By properly adjusting the abutment, the downward movement of the paddle from the position shown in Fig. 4 toward that shown in Fig. 5 can be controlled. When the carriage is moving across the bridge and the blade is swung upwardly to the position of Fig. 4 through engagement with the roller 44 mounted between the track elements 5 of the bridge, it is desired to have this paddle temporarily retained in the raised position. The paddle has therefore been provided with a hook 45 for engaging the hook 46 of the latch 47. This latch 47 is journaled in the arms of the U-shaped bearing bracket 48 which is carried by the side bars 29 and has its handle engaged by the spring 49. This spring has its second end portion connected with the anchor rod or pin 50 and it will be readily seen that the spring will yieldably hold the latch in the operative position shown. From an inspection of Fig. 4, it will be seen that the upper face of the hook 45 and the under face of the hooked end portion of the latch provide cam surfaces which will cause the latch to move and permit of the hook passing above it when the paddle is swung upwardly. When the paddle attempts to return to the operative position, this hook will hold the paddle in the raised or inoperative position until the latch is moved to permit the paddle to drop. In order to permit of the latch being moved to the releasing position, there has been provided an abutment post 51 which is carried by the outer wall of the trough and will engage the extended handle of the latch to swing the latch to the releasing position as the carriage passes the post.

When in use, the trough will be constructed as shown in Fig. 1 with the feed 2 leading to a river or other source of water supply and the spillway 3 also leading to the river so that the water can be returned to the river. The standard or vertical shaft 6 will be set up with its lower end fitting into the rotary pump 9 and the gears 11 and 12 and bearing disk 13 will be put in place. The pipe 10 will be led to the storage tank or point at which the water is to be used and the carriages will be placed upon the trough and connected with the arms which extend from the bearing disk. The connecting bars 52 for the outer end portions of the shafts 16 will then be put in place and the device is ready for use.

When the water is turned into the trough, it will flow through the same and since it moves down hill for the entire length of the trough, it will have a relatively strong current. Upon reaching the lower end of the trough, this water will pass into the spillway 3 and a portion of it will pass through the neck or inner end portion of the spillway into the well 4 thus keeping the well filled with water so that this water can be pumped to the place where it is to be stored or used. As the water passes through the trough, it will engage the depending paddle blades of the carriages which are between the upper inlet end of the trough and the bridge 5 and these carriages will be moved along the walls of the trough and will tend to swing the arms and thus rotate the vertical shaft. As soon as a carriage reaches the bridge, it will move upwardly upon this bridge and will return to the inlet end of the trough. In moving across the bridge, the paddle blade will engage the roller 44 and this paddle blade will be swung upwardly to the inoperative position where it will be retained by engagement of the hook 45 with the latch. As soon as the extended handle of the latch engages the abutment post 51, the paddle blade will be released and may again drop down into the operative position. It should be noted that while the carriage is moving up the lower end portion of the bridge, the paddle blade will continue to extend into the water and therefore the water by acting upon the blade will serve to assist in moving the carriage upwardly upon the bridge. It should be further noted that since the arms are so distributed that only one of the carriages will be moving upwardly upon the bridge while the remaining carriages are moving downwardly upon the trough, the weight and momentum of these carriages coasting down hill will assist in causing easy operation of the device. It will be further noted that with a construction of this character, heavy trucks which would preferably be filled to give additional weight could be connected with the arms and allowed to coast upon the walls of the trough, the trucks passing over the bridge one at a time and the weight and momentum of the remaining trucks serving to carry the trucks over the bridge.

I claim:

1. A current motor comprising a substantially circular trough open at its ends and pitched at a downward incline from its inlet end to its outlet end, a bridge extending upwardly from the outlet end portion of the trough to the inlet end portion thereof, a rotatable operating element, arms radiating from said operating element, carriages carried by said arms and moving upon said trough, and paddle elements carried by said carriages for extending into said trough whereby water flowing through the trough may impart movement to said carriages.

2. The structure of claim 1 having the arms pivotally connected with the operating element and carriages for permitting the carriages to rest upon and follow the pitch of the trough and bridge.

3. The structure of claim 1 including a sump, a spillway communicating with the outlet end of the trough and extended to communicate with the sump and a pump for drawing water out of the sump operated from the operating means.

4. The structure of claim 1 including a sump, a spillway communicating with the outlet end of the trough and extended to communicate with the sump and a pump in the sump for drawing water out of the sump, the operating means including a vertically disposed rotatable standard having the arms connected therewith and having its lower end portion mounted in the pump and imparting movement to the same when the standard rotates.

5. A current motor comprising a substantially circular trough having an inlet end and an outlet end and a connecting bridge, a rotary standard having the trough concentric thereto, a bearing disk carried by said standard, arms pivotally connected with the bearing disk, carriages resting upon the walls of the trough and pivotally connected with the arms whereby the carriages may rest upon and follow the pitch of the trough and bridge, and paddle elements carried by said carriages and movable into and out of an operative position.

6. The structure of claim 5 having the carriages each provided with latch means for releasably holding the paddle element carried thereby in inoperative position, means carried by the bridge for moving the paddle elements to an inoperative position for engagement by the latch means, and means adjacent the inlet end of the trough for moving the latch means to release the paddle means.

7. In a current motor, paddle means comprising a carriage having a wheel carrying structure adjustable to position wheels carried thereby a predetermined distance apart, and a blade mounted for vertical swinging movement into and out of an operative position.

8. In a current motor, paddle means comprising a carriage having a wheel carrying structure including side bars having wheels rotatably connected therewith, a yoke member connected with one side bar and extending towards the second side bar, an arm extending from the second side bar and adjustably connected with said yoke member, a shaft extending through the side bars and yoke member to mount the carriage for vertical rocking movement, and a paddle blade.

9. The structure of claim 8 and clamps carried by the shaft and loosely engaging the side bars to hold the carriage against movement longitudinally of the shaft and permit rocking movement upon the shaft.

10. The structure of claim 8 having the paddle blade provided with hinge members loosely engaging the shaft, one of the hinge members being provided with a longitudinally extending slot, a disk upon the shaft fitting into the slot in the said hinge members, and a clamp adjustable longitudinally upon the shaft and engaging said disk.

11. The structure of claim 7 and a cross strip bridging said yoke member, clamps carried by the cross strip and engaging the yoke member to releasably hold the cross strip in place, one of the clamps engaging the arm extending from the second side bar to hold the arm against movement, and a bracing bar pivotally connected with the paddle blade and passing upwardly through a slot in the cross strip.

In testimony whereof I have hereunto set my hand.

GEORGE W. PRISBREY.